April 5, 1966  TANEKICHI KOGEICHI ETAL  3,244,147
APPARATUS FOR BREEDING ANIMALS
Filed Jan. 14, 1964  4 Sheets-Sheet 2
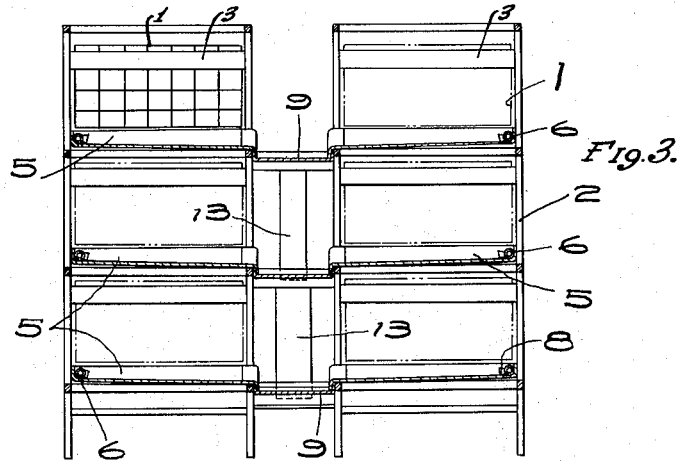
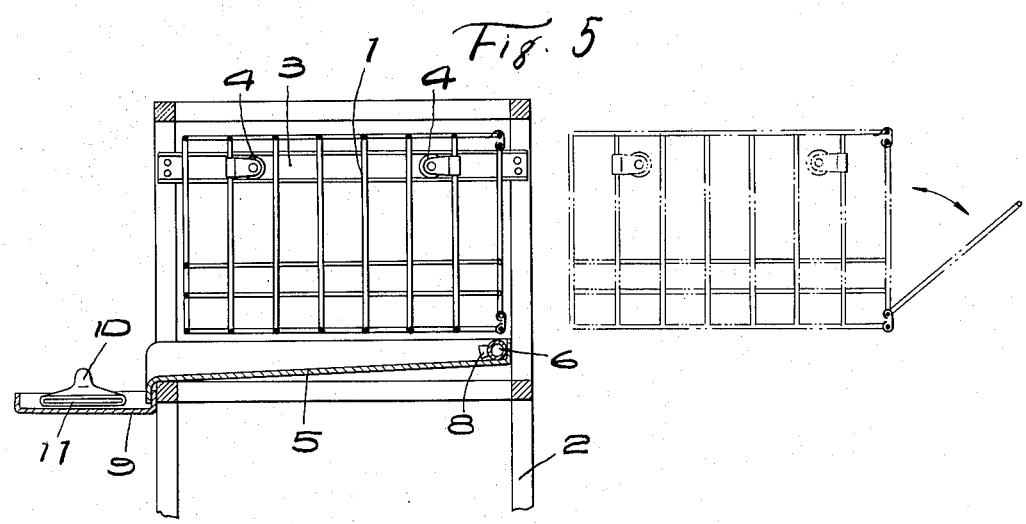
Masao Ueno
Toshiharu Tanaka
INVENTOR.
BY April 5, 1966  TANEKICHI KOGEICHI ETAL  3,244,147
APPARATUS FOR BREEDING ANIMALS
Filed Jan. 14, 1964  4 Sheets-Sheet 4
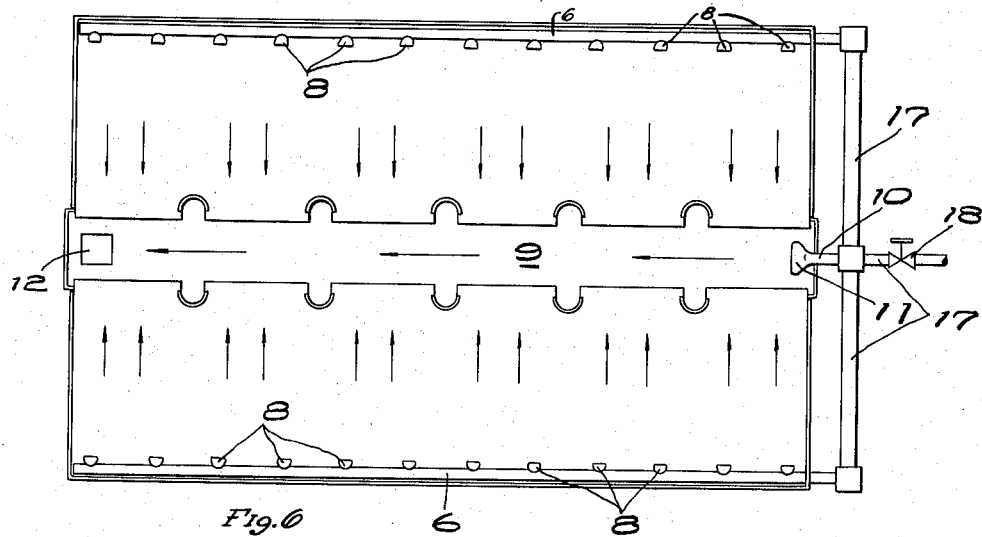
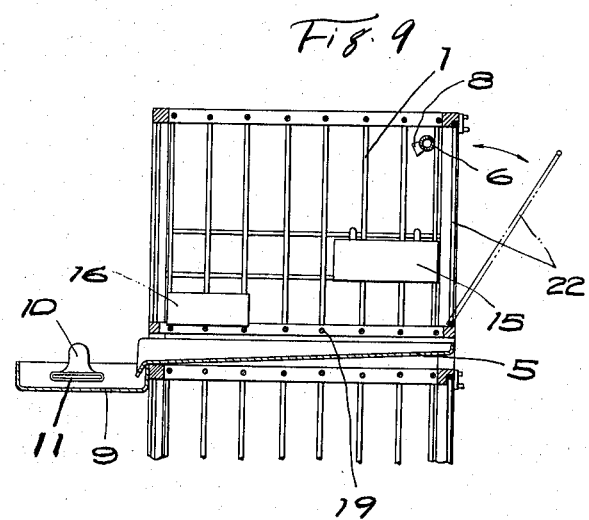
Tanekichi Kogeichi
Minoru Ueno
Toshiharu Tanaka
INVENTOR.
BY *McGlew and Toren,*
 *Attorneys*

United States Patent Office 3,244,147
Patented Apr. 5, 1966

3,244,147
APPARATUS FOR BREEDING ANIMALS
Tanekichi Kogeichi, Tokoji Amagasakishi, and Masao Ueno and Toshiharu Tanaka, Osaka, Japan, assignors to Shionogi & Co. Ltd., Osaka, Japan, a corporation of Japan
Filed Jan. 14, 1964, Ser. No. 337,578
Claims priority, application Japan, Nov. 7, 1963, 38/60,035
7 Claims. (Cl. 119—18)

The present invention relates to the improvement of an apparatus for breeding animals, such as domestic fowls, rabbits, marmots, golden hamsters or the like, and provides means to automatically keep their cages clean and from their excrements at all times.

In the conventional types of domestic animal-breeding apparatuses, the disposal of the excrements of rabbits, marmots, hamsters which are called "laboratory animals" has been achieved either by exchanging the straw littered over the bottom of the cage or by providing a drawer-type bottom to the cage which is removable for discharging the excrements. Such a removable bottom is usually filled with sawdust or the like and, must be pulled out upon occasions to change the sawdust because it readily becomes filthy with animal excrement.

Recently, as means of eliminating these disadvantages the provision of a belt conveyor is applied to a series of cages at their lower parts so that according as the conveyor is driven along, the excrements which fall thereupon are washed away by a washing means provided separately. A disadvantage of such devices is the requirement for the washing means and the particular driving means to drive the belt conveyor. Accordingly, the present invention intends to provide a novel improved animal breeding apparatus which effectively eliminates the above-mentioned disadvantages.

The invention will now be described more fully with reference to the accompanying drawings wherein:

FIG. 3 is a schematic longitudinal side view taken along the line A—A of FIG. 2.

FIG. 5 is an enlarged side view, in longitudinal section, showing the main part of another embodiment of the invention;

FIG. 6 is a schematic plan view showing the main part of another improved apparatus according to the invention; and FIGS. 7, 8 and 9 are enlarged side views, in longitudinal section, showing the main parts of different embodiments of the invention.

Figure 1:
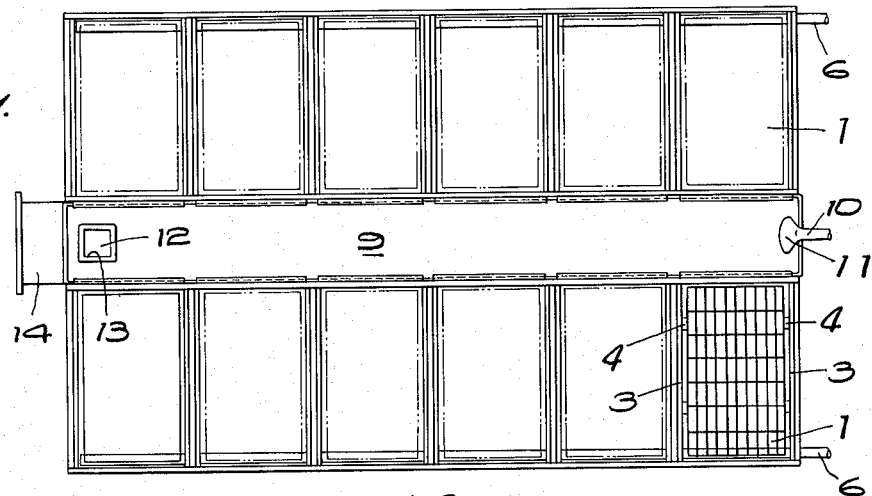
FIG. 1 is a schematic plan view of an animal breeding apparatus according to the invention.
Figure 2:
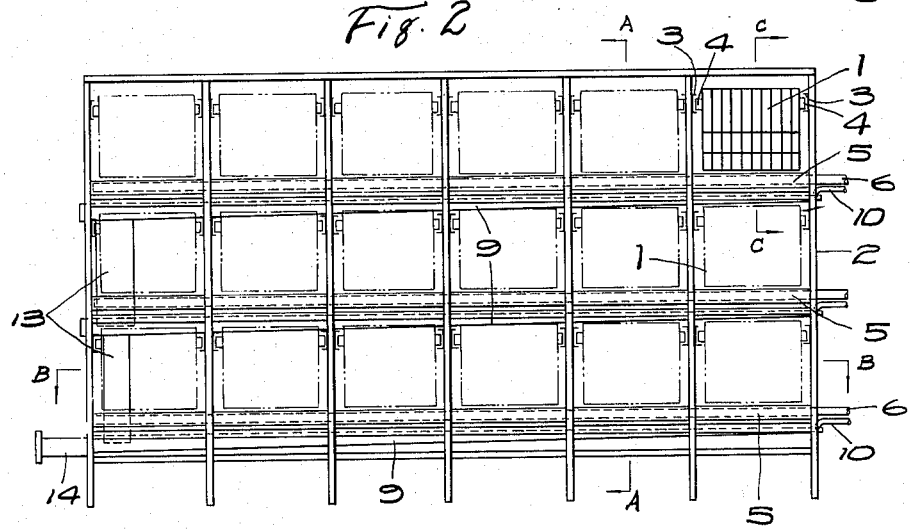
FIG. 2 is a schematic front view of FIG. 1.
Figure 4:
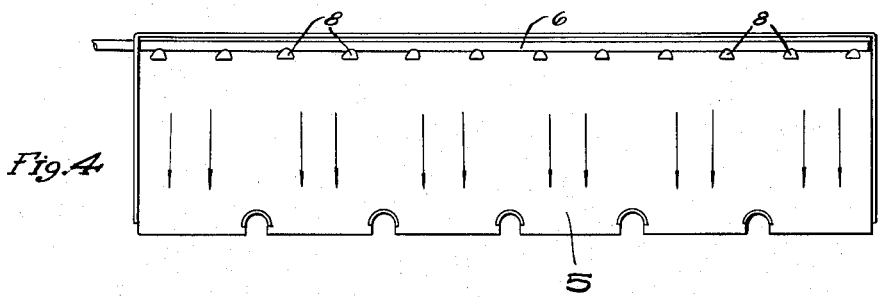
FIG. 4 is an enlarged schematic side-sectional front view taken along the line B—B of FIG. 2.

Referring to the drawings, a plurality of breeding cages 1 are arranged side by side in two rows as shown in FIG. 1, said rows being suitably spaced at their opposed back side. A plurality of such rows are then superimposed one upon another and mounted on a frame 2 as shown in FIG. 2. Each of these cages 1 is secured to the both sides of the supported members 4, 4 inserted slidably within the channel-shaped insides of the supporting rails 3, 3 which are provided in the frame 2 at their opposed side. Thus, each cage is detachably mounted in the frame 2. At the lower part of each cage 1 is provided an excrement-receiving member 5 which is inclined downwardly at its rear portion. Above the excrement-receiving member 5 and within each row of the cages is provided a water-supply pipe 6 which extends laterally through the lower parts of these plural cages 1. Each of the water-supply pipes 6 is closed at its one end while they are connected at their opposite ends to a suitable water supply pipe. A plurality of water jet holes are bored in the rear portion of the water-supply pipe 6, said holes being suitably spaced longitudinally of the pipe 6. The rear or lower end portion of each of said excrement-receiving members 5 is bent downwardly so as to overhang a water-flowing trough 9 laid on the frame 2. A water-supply pipe 10 positioned within the upper inclined end portion of the water-flowing trough 9 is connected to said water source pipe. The water-supply pipe 10 is provided at the foremost ends thereof with nozzle 11. The plural storied water-flowing troughs 9 are interconnected by means of openings 12 provided in the vicinity of the inclined lower end portions thereof through duct members 13. Finally the lowest one of the water-flowing troughs 9 is provided at its inclined lower end portion with a water delivery opening 14.

In addition, indicated with the reference numeral 15 is a nest for the animals, and 16 is a feeder. 22 is the opening and shutting plate with regard to the breeding cage 1. Animals such as rabbits and marmots are housed in the cages 1 and bred therein. The excrements of the housed animals will fall directly onto the excrement-receiving members 5. The disposal of these excrements collected on the members 5 is effected by the switch-over of the valve of said water source pipe to intermittently feed water to the water supply pipes 6 and 10 which, in turn, intermittently jet water through their nozzles 8 and 11 so that the upper surfaces of the excrement-receiving members are washed clean simultaneously.

The water jetted from the nozzles is then collected into the respective water-flowing trough 9 and collected into the lowest water-flowing trough 9 through the cylindrical member 13 wherefrom it may be delivered to the outside through the delivery opening 14. From the above-mentioned preferred embodiment of the invention, it is understood that an animal breeding apparatus according to the present invention is such that a plural row of juxtaposed breeding cages are superimposed one on another, each of the cages being provided at its lower part with a respective inclined plate. Water supply means is provided in the vicinity of the top portion of said inclined plate, and at least those cages which are positioned above the lowermost cage are each provided along the lower edge of its inclined plate with a trough-shaped member, whereby the water supplied by said water-supply means is caused to flow over the respective inclined plates and collect in said trough-shaped members. Thus, the invention affords a greatly important advantage in that it is very simple and easy in manufacture as well as in structure and the disposal of the excrements of breeding animals is effected satisfactorily and sanitarily by a very easy operation of the switch-over of the valve or the like for supplying said water-supply means with water and that the operation can be easily done by a single operator.

Furthermore, according to the invention, while the intended object can be attained by intermittently supplying the above-mentioned water-supply means with water, the object can be more effectively attained by continuously supplying the water-supply means with water to allow water to constantly flow over the above-mentioned inclined plates and thereby to avoid any sticking of the excrements on the inclined plates. Also, according to the invention as shown in the above-mentioned embodiment, the apparatus can be very conveniently employed since each of the cages 1 is so mounted through the supporting rails 3, 3 and the supported members 4, 4 that it may be capable of being taken in and out with respect to the frame. The invention may be more effectively modified as follows; that is, there is provided a further improved novel animal breeding apparatus wherein a plurality of rows of juxtaposed animal breeding cages are superimposed one on another and wherein, each of said cages is provided at its lower portion with a respective inclined plate. Water-supply means is provided in the vicinity of the top portion of said inclined plate. At least those cages which are above the lowermost cage are provided along the lower edge of said inclined plate with water-supply means which provides a flow of water over the inclined plates which flows in said trough-shaped members means and is provided with intermittently opening and closing valve means. In this arrangement, said water-supply means is automatically and intermittently supplied with water whereby the disposing operation of the animal excrements can be automatically effected at regular intervals without requiring manual operation. Thus the breeding of animals is very satisfactorily carried out under the extremely sanitary conditions of the cages.

The above-mentioned modification is shown in FIG. 6 wherein the improved animal breeding apparatus is constituted by additionally providing an automatically intermittently operated switch-over valve 18 placed midway of a water feeding pipe 17 and connected to the previously-mentioned water source pipe through said water-supply pipes 6 and 10.

By this arrangement, it is now made possible to completely automatically operate the disposal of the excrements of breeding animals without requiring any manual operation by allowing the automatically operated switch-over valve 18 to automatically intermittently supply the water feeding pipe 17 with water which is constantly supplied from said water source pipe.

Figure 7:
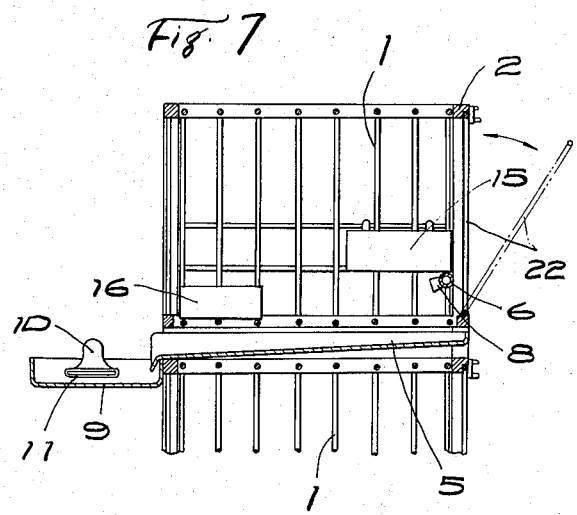
Figure 8:
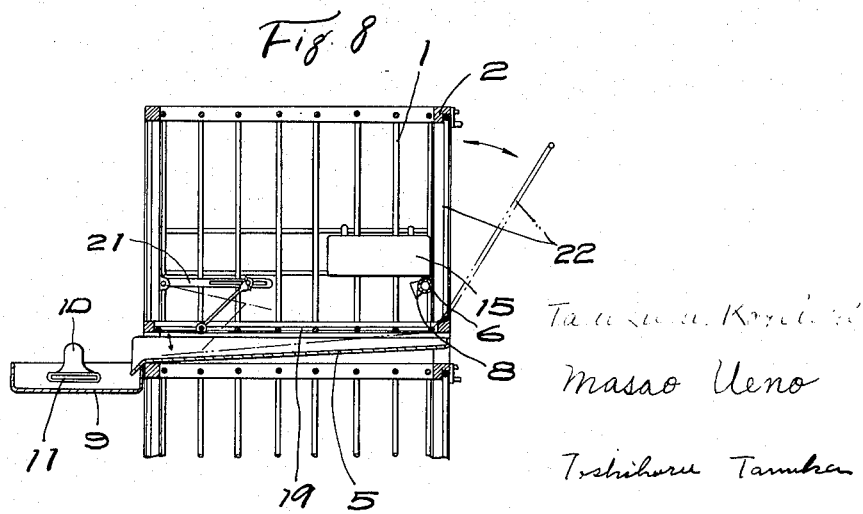

Furthermore, according to the invention, as shown in FIG. 7, each of cages fixedly mounted to each other may be provided at its bottom portion with a hurdle 19 and the water-supply pipe 6 in such a manner that each of these pipes passes through the inside of each cage. Alternatively, as shown in FIG. 8 said hurdle 19 may be pivotally mounted by a hinge 20 in the vicinity of the upper end of said excrement-receiving member 5 so that it is freely swingable, and between the free end of the hurdle 19 and the side-wall portion of the cage 1 there is provided a means 21 for changing and fixing the inclination angle of the hurdle 19. Thus, when the upper surfaces of the excrement-receiving member 5 are washed by jetting water from the jet holes in the nozzles 8, the hurdle 19 may be also washed together with them by lowering the hurdles so as to rest them on the upper surfaces of the excrement-receiving members 5. In addition, in this case, instead of the hurdle 19 netting members may as well be utilized.

Furthermore, according to the invention, as shown in FIG. 9, water-supply pipe 6 may be positioned at the inner upward portion of each cage 1 with a nozzle 8.

Thus, the water jetted from the nozzles 8, if mixed with such chemicals as disinfectant, deodorant or a combination of both, will attain at a time the purposes of washing away the excrement, keeping the caged animals always healthy and sanitary, and also preventing the stenches liable to arise.

In this arrangement, it is also possible to provide the water-supply pipes 6 at the outside portion adjacent to the upper part of each cage 1 so that more efficient operation of the apparatus can be obtained. Although the invention has been described with reference to some preferred embodiments thereof, the invention is by no means limited thereto, it being understood that many other embodiments or modifications thereof may be made without departing from the spirit and scope of the invention.

What we claim is:

1. Apparatus for breeding animals comprising, in combination, a frame; plates secured to said frame to extend longitudinally thereof, said plates being inclined transversely thereof to slope between an upper edge and a lower edge; drainage troughs extending longitudinally of each plate beneath the lower edge thereof, said drainage troughs being longitudinally inclined; water supply means adjacent the upper edge of each plate; support means on said frame above said plates; and animal cages, each having a reticulated floor, disengageably mounted on said support means for ready mounting on and removal from said frame.

2. Apparatus for breeding animals comprising, in combination, a frame; plates secured to said frame to extend longitudinally thereof, said plates being inclined transversely thereof to slope between an upper edge and a lower edge; drainage troughs extending longitudinally of each plate beneath the lower edge thereof, said drainage troughs being longitudinally inclined; water supply means adjacent the upper edge of each plate; support means on said frame above said plates; and animal cages, each having a reticulated floor, disengageably mounted on said support means for ready mounting on and removal from said frame; said plates being arranged as plural pairs of laterally adjacent, laterally spaced plates having their lower edges facing each other, and each drainage trough extending beneath the lower edges of a pair of laterally adjacent plates; said pairs of plates being arranged in vertically spaced relation; said cages being insertible into and removable from said frame at the sides thereof adjacent the upper edges of said plates.

3. Apparatus for breeding animals comprising, in combination, a frame; plates secured to said frame to extend longitudinally thereof, said plates being inclined transversely thereof to slope between an upper edge and a lower edge; drainage troughs extending longitudinally of each plate beneath the lower edge thereof, said drainage troughs being longitudinally inclined; water supply means adjacent the upper edge of each plate; support means on said frame above said plates; and animal cages, each having a reticulated floor, disengageably mounted on said support means for ready mounting on and removal from said frame; said support means comprising guide rails extending transversely of said frame; each cage having guide rollers thereon engageable with said support rails.

4. Apparatus for breeding animals comprising, in combination, a frame; plates secured to said frame to extend longitudinally thereof, said plates being inclined transversely thereof to slope between an upper edge and a lower edge; drainage troughs extending longitudinally of each plate beneath the lower edge thereof, said drainage troughs being longitudinally inclined; water supply means adjacent the upper edge of each plate; support means on said frame above said plates; and animal cages, each having a reticulated floor, disengageably mounted on said support means for ready mounting on and removal from said frame; said plates being arranged as plural pairs of laterally adjacent laterally spaced plates having their lower edges facing each other, and each drainage trough extending beneath the lower edges of a pair of laterally adjacent plates; said pairs of plates being arranged in vertically spaced relation; said cages being insertable into and removable from said frame at the sides thereof adjacent the upper edges of said plates; said support means comprising guide rails extending transversely of said frame; each cage having guide rollers thereon engageable with said support rails.

5. Apparatus for breeding animals comprising, in combination, a frame; plates secured to said frame to extend longitudinally thereof, said plates being inclined transversely thereof to slope between an upper edge and a lower edge; drainage troughs extending longitudinally of each plate beneath the lower edge thereof, said drainage troughs being longitudinally inclined; water supply means adjacent the upper edge of each plate; support means on said frame above said plates; and animal cages, each having a reticulated floor, disengageably mounted on said support means for ready mounting on and removal from said frame; said support means comprising pairs of longitudinally spaced rails extending transversely of said frame; said cages having guide rollers on each end thereof engageable with said rails.

6. Apparatus for breeding animals comprising, in combination, a frame; plates secured to said frame to extend longitudinally thereof, said plates being inclined transversely thereof to slope between an upper edge and a lower edge; drainage troughs extending longitudinally of each plate beneath the lower edge thereof, said drainage troughs being longitudinally inclined; water supply means adjacent the upper edge of each plate; support means on said frame above said plates; animal cages, each having a reticulated floor, disengageably mounted on said support means for ready mounting on and removal from said frame; and water supply means at the upper end of each drainage trough arranged to direct water under pressure longitudinally of the associated drainage trough.

7. Apparatus for breeding animals comprising, in combination, a frame; plates secured to said frame to extend longitudinally thereof, said plates being inclined transversely thereof to slope between an upper edge and a lower edge; drainage troughs extending longitudinally of each plate beneath the lower edge thereof, said drainage troughs being longitudinally inclined; water supply means adjacent the upper edge of each plate; support means on said frame above said plates; animal cages, each having a reticulated floor, disengageably mounted on said support means for ready mounting on and removal from said frame; and a cyclically operable valve controlling said water supply means for periodic flushing of said plates.

References Cited by the Examiner
UNITED STATES PATENTS

| | | | |
|---|---|---|---|
| 1,347,397 | 7/1920 | Newman | 119—17 |
| 2,383,326 | 8/1945 | Lovell | 119—22 |
| 2,640,460 | 6/1953 | Siegel | 119—17 |
| 2,701,547 | 2/1955 | Shaw | 119—22 |
| 2,857,880 | 10/1958 | Stone | 119—17 |
| 3,087,458 | 4/1963 | Bennett | 119—17 |
| 3,098,465 | 7/1963 | Ivey | 119—15 |
| 3,119,373 | 1/1964 | Schmid | 119—28 |

SAMUEL KOREN, *Primary Examiner.*

ALDRICH F. MEDBERY, *Examiner.*